United States Patent [19]

Haahjem

[11] 4,170,433

[45] Oct. 9, 1979

[54] APPARATUS FOR EMPTYING BULK MATERIAL FROM A STORAGE CHAMBER

[75] Inventor: Kaare Haahjem, Vigra, Norway

[73] Assignee: Haahjem Mekaniske A/A, Vigra, Norway

[21] Appl. No.: 870,253

[22] Filed: Jan. 17, 1978

[30] Foreign Application Priority Data

Jan. 17, 1977 [NO] Norway .................................. 770131

[51] Int. Cl.² ............................................ B65G 65/38
[52] U.S. Cl. .......................................... 414/313; 52/3;
    193/34; 198/519; 198/703; 198/861; 414/144
[58] Field of Search ...................... 214/10, 15 R, 15 C,
    214/15 D, 15 E, 17 DB; 198/509, 517, 519, 520,
    703, 861; 52/3, 72, 196

[56] References Cited

U.S. PATENT DOCUMENTS

| | | | |
|---|---|---|---|
| 2,735,591 | 2/1956 | Branchflower | 214/17 DB X |
| 3,229,827 | 1/1966 | Kucera | 214/17 DB |
| 3,777,429 | 12/1973 | Koser | 52/196 |
| 3,980,186 | 9/1976 | Leith | 214/17 DB |

*Primary Examiner*—L. J. Paperner
*Attorney, Agent, or Firm*—Haseltine, Lake & Waters

[57] ABSTRACT

Apparatus for emptying bulk material from a storage chamber comprising a first rake in the storage chamber for transporting material in the longitudinal direction, the first rake being movable vertically and transversely. A vertical transport device is mounted in the storage chamber for transporting material from the storage chamber vertically upwards for removal from the storage chamber. A second rake is mounted in the storage chamber transversely and the second rake is positioned adjacent one end of the first rake at a level therebelow for receiving material longitudinally transported by the first rake to in turn transport the material transversely to the vertical transport device. The vertical transport device comprises a plurality of vertically displaceable buckets with a cover plate arrangement positioned in front of the buckets at a level below the second rake and associated with a mechanism for adjusting the cover plates for downward movement as the storage chamber is emptied of material.

11 Claims, 5 Drawing Figures

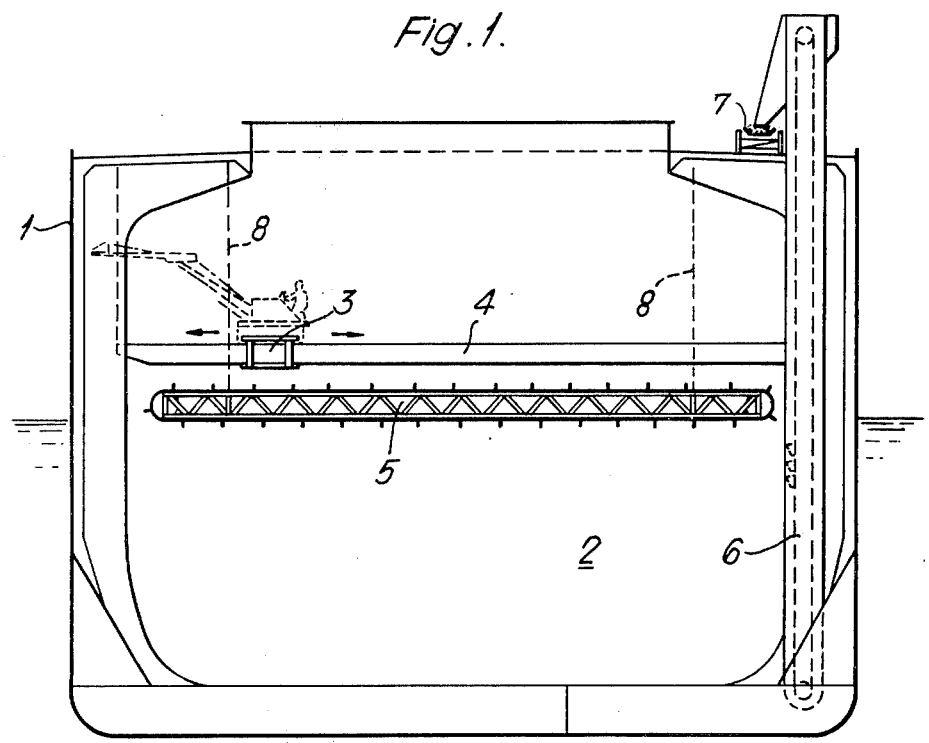
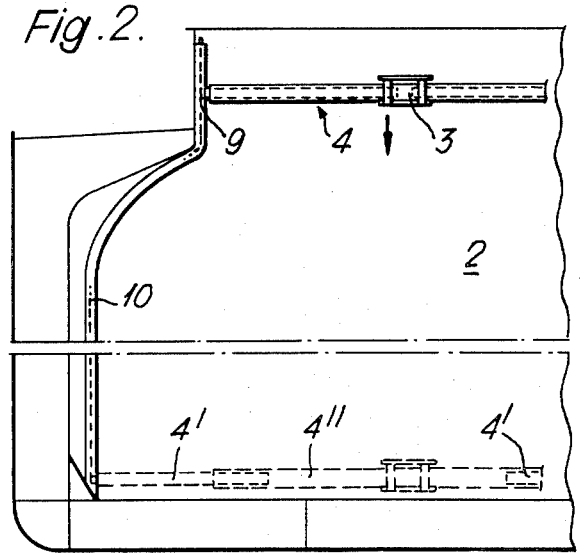

APPARATUS FOR EMPTYING BULK MATERIAL FROM A STORAGE CHAMBER

FIELD OF THE INVENTION

The present invention relates to apparatus for emptying bulk material in a cargo or storage chamber, comprising at least one raking device which is arranged to move the bulk material in one of the main directions of the chamber and which is movable vertically and transversely of the direction of motion of the bulk material.

PRIOR ART

A device of this type is shown, for instance, in French Pat. Nos. 1,343,751 and 911,594. By the use of such devices, for instance, in a ship, for unloading the ship, it will be necessary to move the bulk material up an inclined plane to one or more band conveyors running transversely of the direction the bulk material is being moved by the raking devices. The band conveyors take up space and thus reduce the net cargo volume of the room. Furthermore, since the band conveyors are placed near the bottom of the ship, access for repair and maintenance work is difficult.

In certain shipboard uses, especially in larger ships, frames, reinforcing plates and webs often protrude into the cargo space, thus making it impossible for the raking devices to remove the bulk material adjacent to the outer walls of the cargo space. Furthermore, the raking devices will not be able to cover the entire cross section of the cargo space should the space have varying width in the vertical direction since the guiding beams of the raking devices are dependent upon vertical guides.

SUMMARY OF THE INVENTION

The object of the invention is to provide apparatus for emptying a cargo or storage chamber of the above type which overcome the deficiencies and drawbacks mentioned above.

In accordance with the invention there is provided an apparatus for emptying bulk material from a storage chamber, said apparatus comprising first rake means in said storage chamber for transporting material in the storage chamber in a first direction therein, means for moving said first rake means vertically, means for moving said first rake means transversely of said first direction, vertical transport means for transporting material from the storage chamber vertically for removal from said storage chamber, second rake means in said storage chamber extending at an angle with respect to said first rake means for transporting material in the storage chamber in a second direction therein to said vertical transport means, and means for moving said second rake means vertically, said second rake means being positioned adjacent one end of said first rake means for receiving material transported by said first rake means in said first direction and for transporting the material in said second direction to said vertical transport means.

BRIEF DESCRIPTION OF THE DRAWINGS

FIG. 1 is a transverse cross section through the cargo space of a ship in which emptying apparatus according to the invention is installed without a bulky horizontal band conveyor in the lower part of the cargo space.

FIG. 2 is a cross section of a cargo room having varying width in the vertical direction.

DETAILED DESCRIPTION

Figure 3:
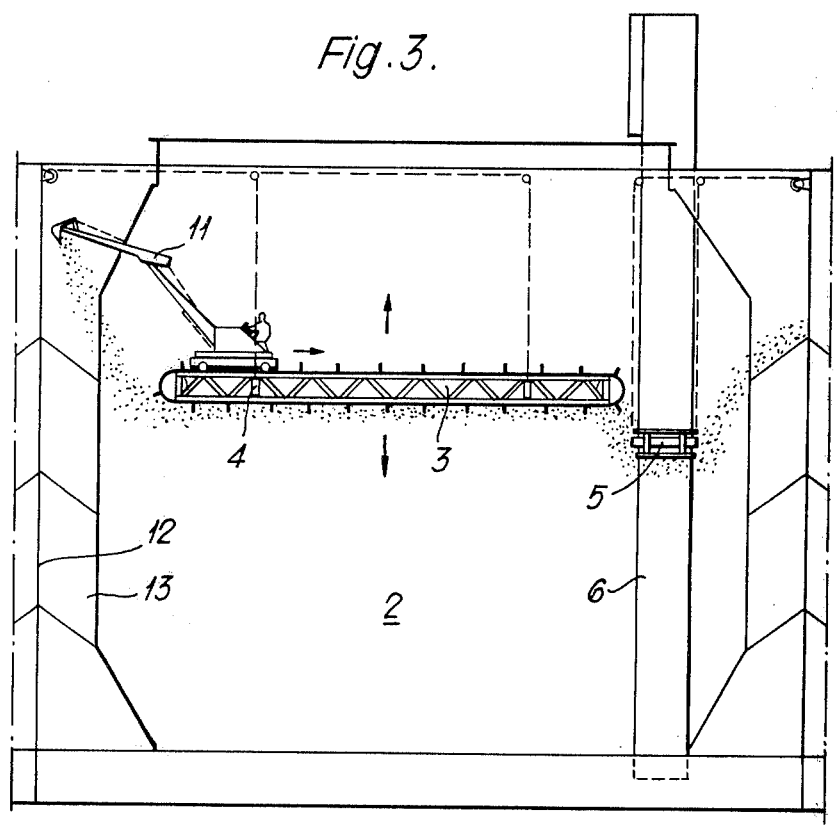
FIG. 3 is the longitudinal cross section through a cargo space of the ship with the apparatus according to the invention.

In FIG. 1 is shown a cross section of a ship hull 1 with a cargo space 2 in which is installed a raking device 3. The raking device is able to move bulk cargo in the longitudinal direction of the ship, i.e. perpendicular to the plane of the ship, and the raking device 3 transversely movable relative to the longitudinal direction of the ship along guiding beam 4 which in turn is moveable vertically in guides (not shown) at its ends. Furthermore, at one end of the raking device 3, a similar raking device 5 is arranged extending at an angle relative to the raking device 3, preferably transversely, i.e. perpendicularly to the latter as shown. The transverse raking device 5 is able to move the bulk cargo towards a vertical transporting device 6 placed, for instance, near one side of the cargo space. In the embodiment shown, the vertical transporting device 6 is in the form of bucket conveyor delivering bulk cargo upwardly to a band conveyor 7 on the deck of the ship. Instead of a bucket conveyor, a screw conveyor or any other suitable vertical transporting device may be used. The transverse raking device 5 may be divided into in two or more raking devices delivering bulk cargo to the same or separate vertical transporting devices. The transverse raking device is movable vertically, for instance by means of suspension members 8 of variable length. The transverse raking device is preferably held at a somewhat lower level than the main raking device 3 so that a certain slip angle is obtained from the latter. Thus, the material falls under the action of gravity, resulting in energy savings.

By using a transverse raking device together with a vertical transporting device, a higher degree of filling of the cargo space is obtained since the dead volume beneath inclined planes leading to the transverse band conveyors, is avoided. Furthermore, repair and maintenance work becomes easier because the rakes at all times may be situated above the cargo.

FIG. 2 shows how a raking device is installed in a cargo space 2 with substantially varying width in the vertical direction. The raking device 3 with the guide beam 4 are shown in solid lines in the upper position and in broken lines in a lower position. The lower position illustrates how the guide beam 4 is constituted by two outer sections 4' telescopically arranged in middle section 4". The outer sections 4' of the guide beam are equipped at their outer ends with rollers 9 or the like gliding in guides 10 which generally follow the sidewalls of the cargo space. The middle section 4" of the guide beam is shorter than the smallest distance between the guides 10.

The middle section 4" of the guide beam may alternatively be arranged floating on the two outer sections 4' in order for it to be movable with the raking device 3 all the way out to the guides 10 even when the guide beam 4 is located in a lower position. Thereby, possible problems are avoided since the raking device 3 does not have to be moved from the middle section 4" to one of the outer sections 4', or vice versa.

FIG. 3 shows a longitudinal cross section through the cargo space 2. Therein, it is seen that the main rake 3 moves bulk material in the longitudinal direction of the cargo space, to transverse rake 5 which in turn moves the material to the vertical transporting device 6. The main rake 3 is equipped with an excavating arm means 11 which is movable and pivotably arranged on the rake. By means of the excavating arm means 11, bulk material may be extracted from between frames 12 and stiffening plates 13 so that the main rake 3, and the transverse rake 5 may respectively move the material towards the vertical transporting device. Since the excavating arm means 11 is movable on the rake 3, it is able to reach all remaining material between the frames or protrusions so that the vessel in most cases may be completely unloaded without further equipment.

Figure 4:
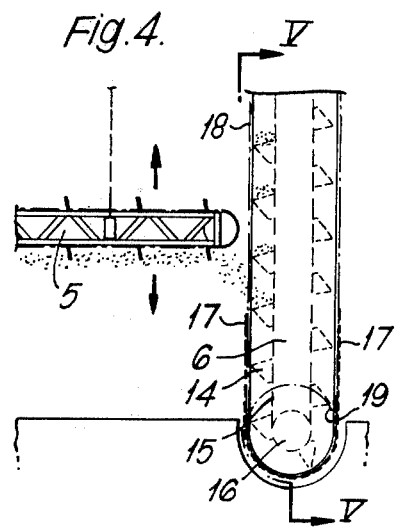
FIG. 4 shows a part of the apparatus according to the invention in FIG. 1 on a larger scale.

FIG. 4 shows in greater detail an especially suitable embodiment of the transporting device 6. It is constituted by a band conveyor with buckets 14 attached to a number of endless chains 15 running over upper and lower driving and turning wheels 16, of which only the lower one is shown.

Figure 5:
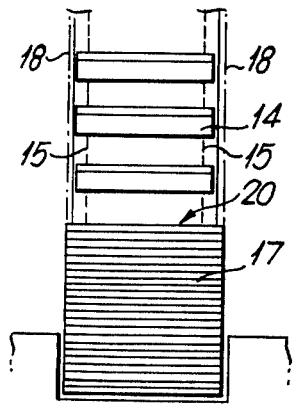
FIG. 5 shows the device in FIG. 4 viewed in the direction of the arrows V—V in FIG. 4.

That part of the bucket conveyor which at any time lies below the level of the surrounding bulk material, is protected by plates 17 which are attached to chains which run over lower turning wheels 19. The plates 17 and the chains 18 together form a roll-front type device whose upper edge 20, as is best shown in FIG. 5, may be lowered to expose the bucket conveyor as the level of the bulk material is reduced. The upper edge 20 of the roll-front device is at all times held somewhat lower than the transverse rake 5 so that the bulk material may slide from the end of the rake down into the buckets 14 of the conveyor.

The expression "vertical transporting device" used in the preceding description is not meant to be restricted to a transporting device arranged absolutely vertically in the space, but may comprise any suitable transporting device able to move the bulk material from a lower to a higher level. Furthermore, more than one vertical transporting device may be arranged in a single space where this may be deemed expedient.

What is claimed is:

1. Apparatus for emptying bulk material from a storage chamber, said apparatus comprising first rake means in said storage chamber for transporting material in the storage chamber in a first direction therein, means for moving said first rake means vertically, means for moving said first rake means transversely of said first direction, vertical transport means for transporting material from the storage chamber upwardly for removal from said storage chamber, second rake means in said storage chamber extending at an angle with respect to said first rake means for transporting material in the storage chamber in a second direction therein to said vertical transport means, and means for moving said second rake means vertically, said second rake means being positioned adjacent one end of said first rake means for receiving material transported by said first rake means in said first direction and for transporting the material in said second direction to said vertical transport means.

2. Apparatus as claimed in claim 1 wherein said vertical transport means comprises bucket means for transporting the material upwards for removal from the storage chamber.

3. Apparatus as claimed in claim 1 wherein said first and second rake means extend in horizontal planes at right angles to one another.

4. Apparatus as claimed in claim 3 comprising excavating arm means on said first rake means for moving bulk material at the perimeter of the storage chamber towards the first raking means.

5. Apparatus as claimed in claim 1 wherein said vertical transport means comprises cover plates extending vertically adjacent said second rake means and means for progressively moving said cover plates downwardly as the storage chamber is emptied of material.

6. Apparatus as claimed in claim 5 wherein said vertical transport means further comprises means connecting said cover plates in roll-front manner.

7. Apparatus as claimed in claim 6 wherein said vertical transport means further comprises vertically arranged band means, said cover plates being attached to said band means, and roller means drivingly engaging said band means.

8. Apparatus as claimed in claim 7 wherein said roller means is located proximate the bottom of said vertical transport means.

9. Apparatus as claimed in claim 1 wherein said storage chamber is substantially rectangular and includes opposite pairs of bounding walls, said vertical transport means being located proximate one of said walls.

10. Apparatus as claimed in claim 9 wherein said first rake means extends parallel to one of said pair of walls, the second rake means extending parallel to the other of said pair of walls, the wall which the vertical transport means is proximate to being one of said one pair of walls.

11. Apparatus as claimed in claim 1 wherein said second rake means is positioned at a level below said first rake means.

* * * * *